United States Patent
Kössi et al.

(10) Patent No.: US 7,697,893 B2
(45) Date of Patent: *Apr. 13, 2010

(54) TECHNIQUES FOR AD-HOC MESH NETWORKING

(75) Inventors: Jouni Kössi, Espoo (FI); Miia Vainio, Espoo (FI)

(73) Assignee: Nokia Corporation, Espoo (FI)

( * ) Notice: Subject to any disclaimer, the term of this patent is extended or adjusted under 35 U.S.C. 154(b) by 230 days.

This patent is subject to a terminal disclaimer.

(21) Appl. No.: 10/870,060

(22) Filed: Jun. 18, 2004

(65) Prior Publication Data

US 2005/0282494 A1    Dec. 22, 2005

(51) Int. Cl.
H04B 7/00    (2006.01)

(52) U.S. Cl. .................. 455/41.2; 455/39; 455/500; 455/514

(58) Field of Classification Search ............. 455/39, 455/41.2, 519, 500, 514, 517
See application file for complete search history.

(56) References Cited

U.S. PATENT DOCUMENTS

| | | | |
|---|---|---|---|
| 5,239,678 | A | 8/1993 | Grube et al. |
| 5,307,370 | A | 4/1994 | Eness |
| 5,677,927 | A | 10/1997 | Fullerton et al. |
| 5,687,169 | A | 11/1997 | Fullerton |
| 6,021,516 | A | 2/2000 | Okajima et al. |
| 6,144,464 | A | 11/2000 | Rupp et al. |
| 6,172,673 | B1 | 1/2001 | Lehtinen et al. |
| 6,349,199 | B1 | 2/2002 | Armantrout |
| 6,507,734 | B1 | 1/2003 | Berger et al. |
| 6,539,503 | B1 | 3/2003 | Walker |

(Continued)

FOREIGN PATENT DOCUMENTS

CA    2443871    2/2003

(Continued)

OTHER PUBLICATIONS

The Bluetooth Special Interest Group, Specification of The Bluetooth System, vol. 1 & vol. 2, Core and Profiles: Version 1.1, Feb. 22, 2001.

(Continued)

*Primary Examiner*—Nay A Maung
*Assistant Examiner*—Tuan H Nguyen
(74) *Attorney, Agent, or Firm*—Locke Lord Bissell & Liddell (57) ABSTRACT

A wireless communications device includes a first radio and a second radio. The first radio is receives information regarding an ad-hoc mesh wireless network from at least one remote device. The second radio exchanges user data with the ad-hoc wireless mesh network. The wireless communications device also includes a buffer and a scheduler. The buffer stores user data for transmission to one or more remote devices in the ad-hoc wireless mesh network. The scheduler schedules transmissions by the second radio of the user data based on the received information. The first and second radios may employ various communications technologies. Examples of such technologies include Bluetooth, wireless local area network (WLAN), and ultra wideband (UWB). The information received from the remote device may include one or more of the following: configuration information (e.g., topology information) corresponding to the ad-hoc wireless mesh network; routing information; and information regarding communications capabilities of one or more nodes within the ad-hoc wireless mesh network.

33 Claims, 8 Drawing Sheets

U.S. PATENT DOCUMENTS

| | | | |
|---|---|---|---|
| 6,549,567 B1 | 4/2003 | Fullerton | |
| 6,556,825 B1 | 4/2003 | Mansfield | |
| 6,571,089 B1 | 5/2003 | Richards et al. | |
| 6,571,212 B1 | 5/2003 | Dent | |
| 6,587,949 B1 | 7/2003 | Steinberg | |
| 6,636,749 B2* | 10/2003 | Holmes et al. | 455/569.2 |
| 6,799,287 B1 | 9/2004 | Sharma et al. | |
| 6,915,119 B1* | 7/2005 | Konishi | 455/127.1 |
| 6,941,132 B2* | 9/2005 | Van Lieshout et al. | 455/418 |
| 6,957,086 B2 | 10/2005 | Bahl et al. | |
| 6,959,199 B2 | 10/2005 | Ohkubo et al. | |
| 6,961,541 B2 | 11/2005 | Overy et al. | |
| 6,993,343 B2 | 1/2006 | Yoshii et al. | |
| 7,010,320 B2 | 3/2006 | Komatsu | |
| 7,046,716 B1 | 5/2006 | Miao | |
| 7,058,071 B1* | 6/2006 | Myles et al. | 370/419 |
| 7,088,795 B1 | 8/2006 | Aiello et al. | |
| 7,096,033 B1* | 8/2006 | Bell | 455/519 |
| 7,103,314 B2 | 9/2006 | Li | |
| 7,135,985 B2 | 11/2006 | Woolger et al. | |
| 7,269,774 B2 | 9/2007 | Sudo | |
| 2001/0007815 A1 | 7/2001 | Philipsson | |
| 2001/0049262 A1 | 12/2001 | Lehtonen | |
| 2001/0055356 A1 | 12/2001 | Davies | |
| 2002/0003792 A1 | 1/2002 | Schmidt et al. | |
| 2002/0065099 A1 | 5/2002 | Bjorndahl | |
| 2002/0073269 A1 | 6/2002 | Kawashima et al. | |
| 2002/0080866 A1 | 6/2002 | Bouet et al. | |
| 2002/0136268 A1 | 9/2002 | Gan et al. | |
| 2002/0151276 A1 | 10/2002 | Ito | |
| 2002/0164997 A1 | 11/2002 | Parry | |
| 2002/0172262 A1 | 11/2002 | Sugaya et al. | |
| 2003/0032422 A1 | 2/2003 | Wynbeek | |
| 2003/0035423 A1 | 2/2003 | Beckmann et al. | |
| 2003/0063196 A1 | 4/2003 | Palatov et al. | |
| 2003/0078037 A1 | 4/2003 | Auckland et al. | |
| 2003/0100288 A1 | 5/2003 | Tomlinson, Jr. et al. | |
| 2003/0108010 A1 | 6/2003 | Kim et al. | |
| 2003/0137966 A1 | 7/2003 | Odman et al. | |
| 2003/0147453 A1 | 8/2003 | Bantra | |
| 2003/0148767 A1 | 8/2003 | Sugaya et al. | |
| 2003/0156589 A1* | 8/2003 | Suetsugu | 370/396 |
| 2003/0174048 A1 | 9/2003 | McCorkle | |
| 2003/0203741 A1* | 10/2003 | Matsuo et al. | 455/519 |
| 2003/0232620 A1 | 12/2003 | Runkle et al. | |
| 2004/0008617 A1 | 1/2004 | Dabak et al. | |
| 2004/0066762 A1 | 4/2004 | Alastalo | |
| 2004/0147223 A1* | 7/2004 | Cho | 455/41.2 |
| 2004/0151109 A1 | 8/2004 | Batra et al. | |
| 2004/0153676 A1 | 8/2004 | Krantz et al. | |
| 2004/0204076 A1 | 10/2004 | Kotzin | |
| 2004/0214568 A1 | 10/2004 | Anderson | |
| 2004/0219897 A1 | 11/2004 | Choi | |
| 2004/0235468 A1 | 11/2004 | Luebke et al. | |
| 2005/0031051 A1 | 2/2005 | Rosen et al. | |
| 2005/0037775 A1 | 2/2005 | Moeglein et al. | |
| 2005/0048918 A1* | 3/2005 | Frost et al. | 455/41.2 |
| 2005/0058107 A1 | 3/2005 | Salokannel et al. | |
| 2005/0058116 A1 | 3/2005 | Palin et al. | |
| 2005/0058152 A1 | 3/2005 | Oksanen et al. | |
| 2005/0059345 A1 | 3/2005 | Palin et al. | |
| 2005/0068965 A1* | 3/2005 | Lin et al. | 370/395.21 |
| 2005/0078598 A1 | 4/2005 | Batra et al. | |
| 2005/0097408 A1 | 5/2005 | Palin et al. | |
| 2005/0099943 A1* | 5/2005 | Naghian et al. | 370/229 |
| 2005/0193309 A1 | 9/2005 | Grilli et al. | |
| 2005/0266808 A1* | 12/2005 | Reunamaki et al. | 455/101 |
| 2005/0283207 A1 | 12/2005 | Hochmair et al. | |
| 2006/0036922 A1 | 2/2006 | Hong et al. | |
| 2007/0083922 A1 | 4/2007 | Reiner | |

FOREIGN PATENT DOCUMENTS

| | | |
|---|---|---|
| CN | 1496020 A | 5/2004 |
| DE | 10140446 A1 | 3/2003 |
| EP | 099717 A2 | 5/2000 |
| EP | 1 185 033 A1 | 3/2002 |
| EP | 1274194 A1 | 1/2003 |
| EP | 1 389 855 A2 | 2/2004 |
| EP | 1515473 | 3/2005 |
| EP | 1515473 A2 | 3/2005 |
| GB | 2 287 383 | 9/1995 |
| WO | WO 99/38302 | 7/1999 |
| WO | WO 99/41876 | 8/1999 |
| WO | WO 99/45319 | 6/2001 |
| WO | WO 02/21746 A2 | 3/2002 |
| WO | 02/082291 | 10/2002 |
| WO | 03/024036 A1 | 3/2003 |
| WO | 03/081846 A1 | 10/2003 |
| WO | WO 03/084146 A1 | 10/2003 |

OTHER PUBLICATIONS

O'Donnell et al., "An Integrated, Low Power, Ultra-Wideband Transceiver Architecture for Low-Rate, Indoor Wireless Systems", Dept. of Electrical Engineering & Computer Science, University of California, Berkeley, Berkeley, CA, 8 pgs.

P. I. I. Withington, et al., "An Impulse Radio Communication System", "Proceedings of the International Conference on Ultra-Wideband, Short Pulse Electromagnetics", (ISBN 0-306-44530-1), Oct. 19, 1992, pp. 113-200.

J. Bray and C. Sterman, "Bluetooth 1.1-Connect Without Cables", Prentice Hall Inc., Upper Saddle River, NJ 1002 (ISBN 0-13-066106-6), Sects. 5.4., pp. 70-78.

D. J. Costello, Jr., et al., "Applications of Error-Control Coding", IEEE Transactions of Information Theory, Oct. 1998, vol. 44, pp. 2531-2560.

Walter Hirt, "Ultra-wideband radio technology: overview and future research", Computer Communications, Amsterdam, NL, vol. 26, No. 1, Feb. 2003, pp. 46-52.

PCT Search Report, Oct. 10, 2005, 6 pages.

* cited by examiner

TECHNIQUES FOR AD-HOC MESH NETWORKING

FIELD OF THE INVENTION

The present invention relates to wireless communications. More particularly, the present invention relates to data communications in mesh networks.

BACKGROUND OF THE INVENTION

Ad-hoc networks include multiple devices or nodes that exchange wireless signals. During operation, nodes may enter and leave the proximity of other nodes. Thus, the composition of an ad-hoc network may change over time. Moreover, the mobility of nodes may cause changes in various network characteristics, such as topology. Despite a lack of centralized authority or existing infrastructure, ad-hoc networks are typically capable of rearranging themselves in response to such events.

Recently, ad hoc networking techniques have been considered an attractive technology for implementing mesh networks, which provide a multipoint-to-multipoint network topology. In such networks, communication between two devices may occur across one or more intermediate or relaying nodes. Such communications are referred to as multihop communications.

The application of ad-hoc communications techniques to multihop networking is viewed as a way to provide new applications for mobile device users. In addition, this application has the potential to provide new opportunities for the communications industry in the areas of terminal manufacturing, software engineering, and the deployment of network infrastructure to interconnect ad-hoc networks. Moreover, this application of ad-hoc communications techniques to multihop networking provides for various consumer uses. Examples of such uses include applications related to teenager and other group networking, Internet access, authentication applications, and home networking.

Bluetooth and wireless local area networks (WLAN) are examples of wireless ad-hoc networking technologies. Bluetooth provides a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The devices operate in the 2.4 GHz radio band reserved for general use by Industrial, Scientific, and Medical (ISM) applications. Bluetooth devices are designed to find other Bluetooth devices within their communications range and to discover what services they offer.

WLANs are local area networks that employ high-frequency radio waves rather than wires to exchange information between devices. IEEE 802.11 refers to a family of WLAN standards developed by the IEEE. In general, WLANs in the IEEE 802.11 family provide for 1 or 2 Mbps transmission in the 2.4 GHz band using either frequency hopping spread spectrum (FHSS) or direct sequence spread spectrum (DSSS) transmission techniques.

Within the IEEE 802.11 family are the IEEE 802.11b and IEEE 802.11g standards. IEEE 802.11b (also referred to as 802.11 High Rate or Wi-Fi) is an extension to IEEE 802.11 and provides for data rates of up to 11 Mbps in the 2.4 GHz band. This provides for wireless functionality that is comparable to Ethernet. IEEE 802.11b employs DSSS transmission techniques. IEEE 802.11g provides for data rates of up to 54 Mbps in the 2.4 GHz band. For transmitting data at rates above 20 Mbps, IEEE 802.11g employs Orthogonal Frequency Division Multiplexing (OFDM) transmission techniques. However, for transmitting information at rates below 20 Mbps, IEEE 802.11g employs DSSS transmission techniques. The DSSS transmission techniques of IEEE 802.11b and IEEE 802.11g involve signals that are contained within a 23 MHz wide channel. Several of these 23 MHz channels are within the ISM band.

Other technologies are also applicable for the exchange of information at higher data rates. Ultra wideband (UWB) is an example of such a higher data rate technology. Since gaining approval by the Federal Communications Commission (FCC) in 2002, UWB techniques have become an attractive solution for short-range wireless communications. Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps make IR much more immune to multipath propagation problems than conventional continuous wave radios. RF gating is a particular type of IR in which the impulse is a gated RF pulse. This gated pulse is a sine wave masked in the time domain with a certain pulse shape.

To participate in an ad-hoc multihop network, a device needs to provide several features. Examples of such features include interference avoidance, link management, and routing. Moreover, certain wireless communication technologies are better suited for the exchange of control information, while other wireless communication technologies may be better suited for the transfer of user data. For instance, Bluetooth on its own is not well suited for many forms of user data. However, higher data rate technologies (e.g., WLAN and UWB) are often not efficient for the transfer of network control information.

Therefore, techniques are needed for the effective use of ad hoc techniques. in multihop networks.

SUMMARY OF THE INVENTION

The present invention provides techniques involving devices having multiple radios, where each radio may be utilized for different dedicated purposes. These techniques advantageously maximize the efficiency of the mobile ad-hoc multihop networking.

Accordingly, a wireless communications device provided by the present invention includes a first radio and a second radio. The first radio receives information regarding an ad-hoc mesh wireless network from at least one remote device. The second radio exchanges user data with the ad-hoc wireless mesh network. The wireless communications device also includes a buffer and a scheduler. The buffer stores user data for transmission to one or more remote devices in the ad-hoc wireless mesh network. The scheduler schedules transmissions by the second radio of the user data based on the received information.

The first and second radios may employ various communications technologies. Examples of such technologies include Bluetooth, wireless local area network (WLAN), and ultra wideband (UWB).

The information received from the remote device may include one or more of the following: configuration information (e.g., topology information) corresponding to the ad-hoc wireless mesh network; routing information; and information regarding communications capabilities of one or more nodes within the ad-hoc wireless mesh network. The wireless communications device may store this information. Accordingly, the device may include a memory for this storage.

In addition, the present invention provides a method, device, and computer program product that establishes a short-range wireless communications link with a remote device. This link employs a control radio. Across this link, control information is exchanged that pertains to an ad-hoc mesh wireless network. Further, the method, device, and computer program product designate a data radio for the exchange of user data with one or more devices in the ad-hoc mesh wireless network.

The method, device, and computer program product may employ the data radio to transmit the user data. This may include establishing a transmission schedule for the user data, and sending the transmission schedule to the remote device across the short-range wireless communications link. Also, this may include transmitting a request to the remote device across the short-range wireless communications link. This request is for additional communications capacity when a communications capacity allocated to the data radio is insufficient to transmit the user data. In response to this request, a grant of additional communications capacity for the data radio may be received from the remote device.

The present invention advantageously provides for communications in mesh networks. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1A:
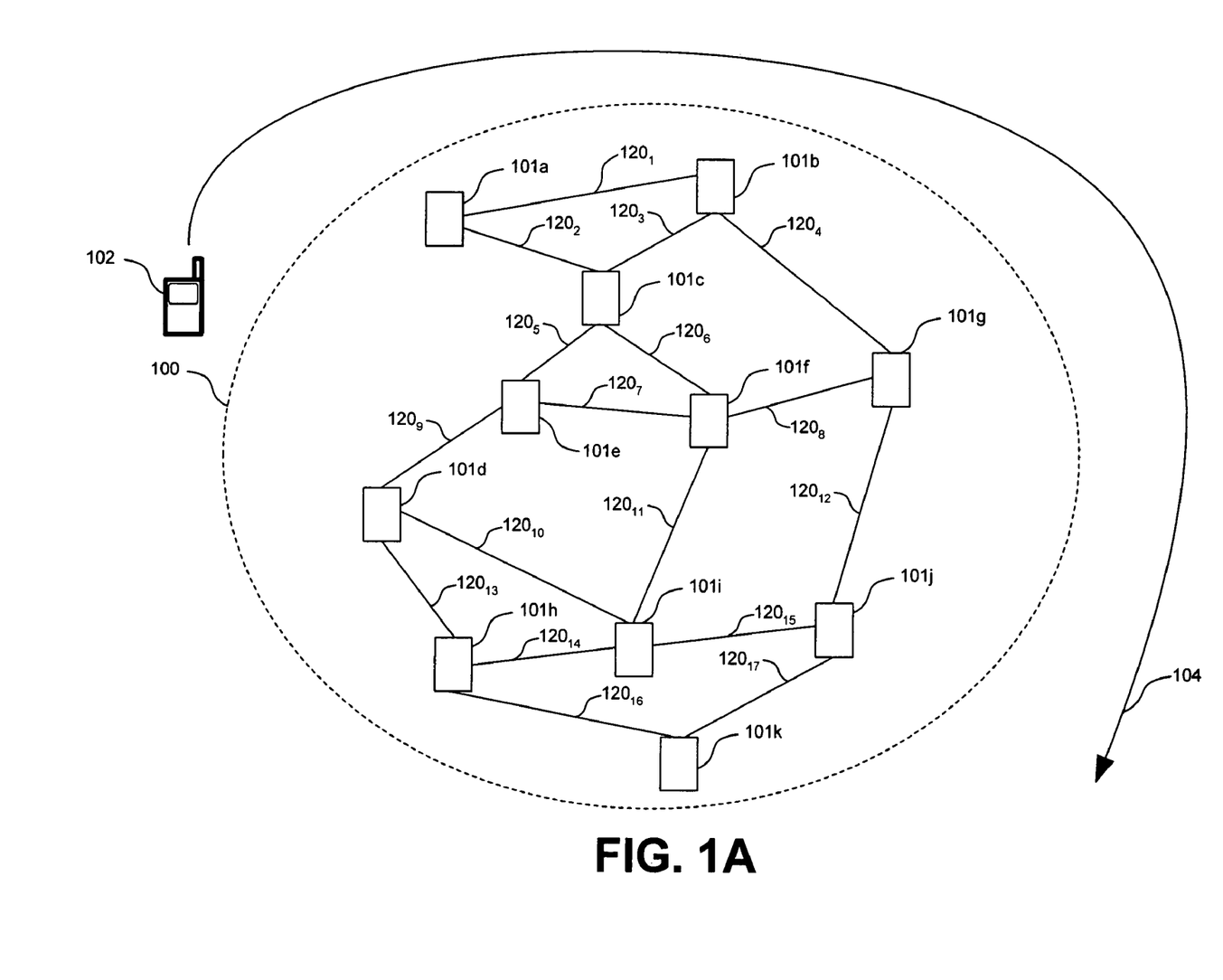
FIGS. 1A-1C are diagrams of an exemplary operational environment.
Figure 1B:
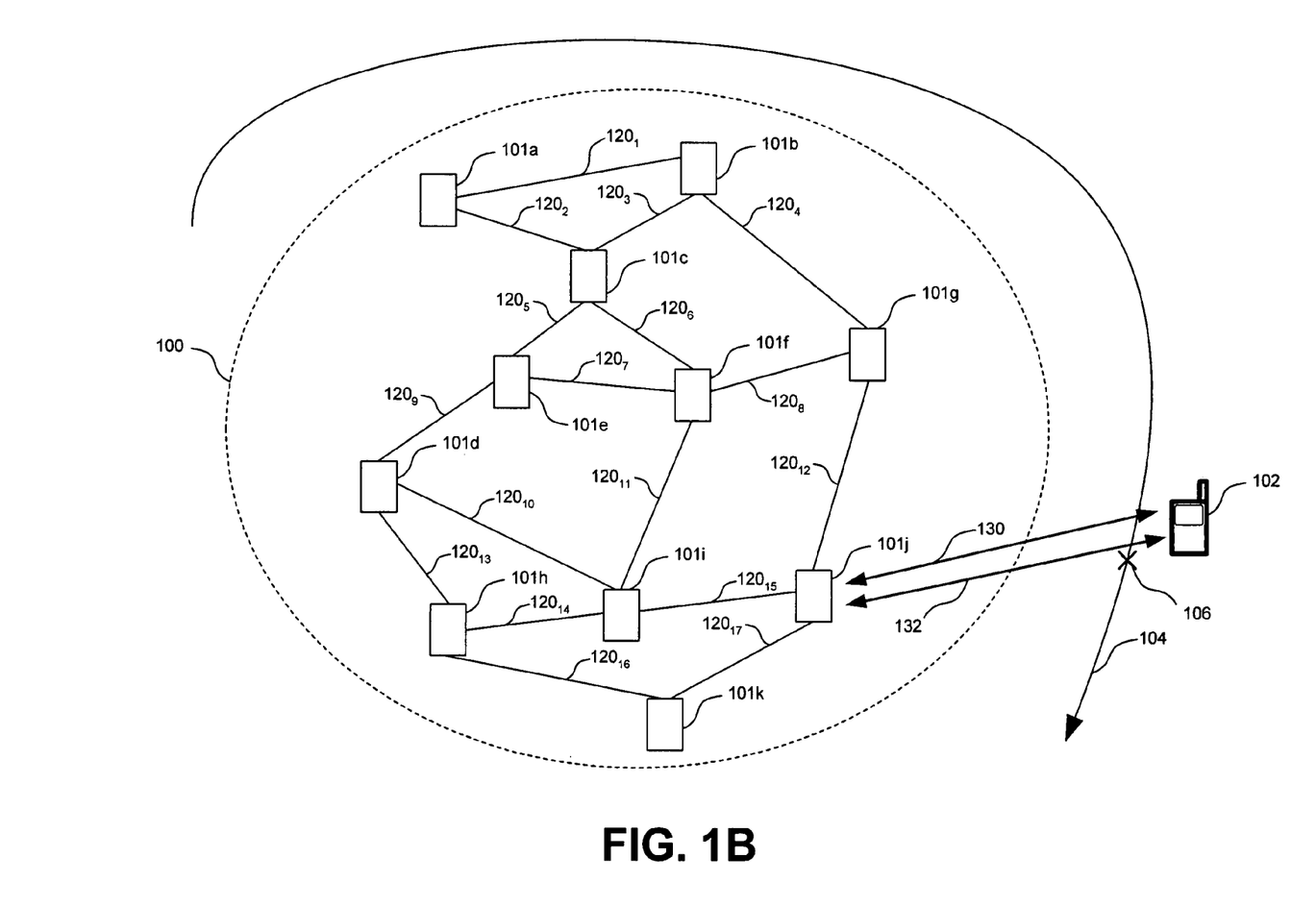
Figure 1C:
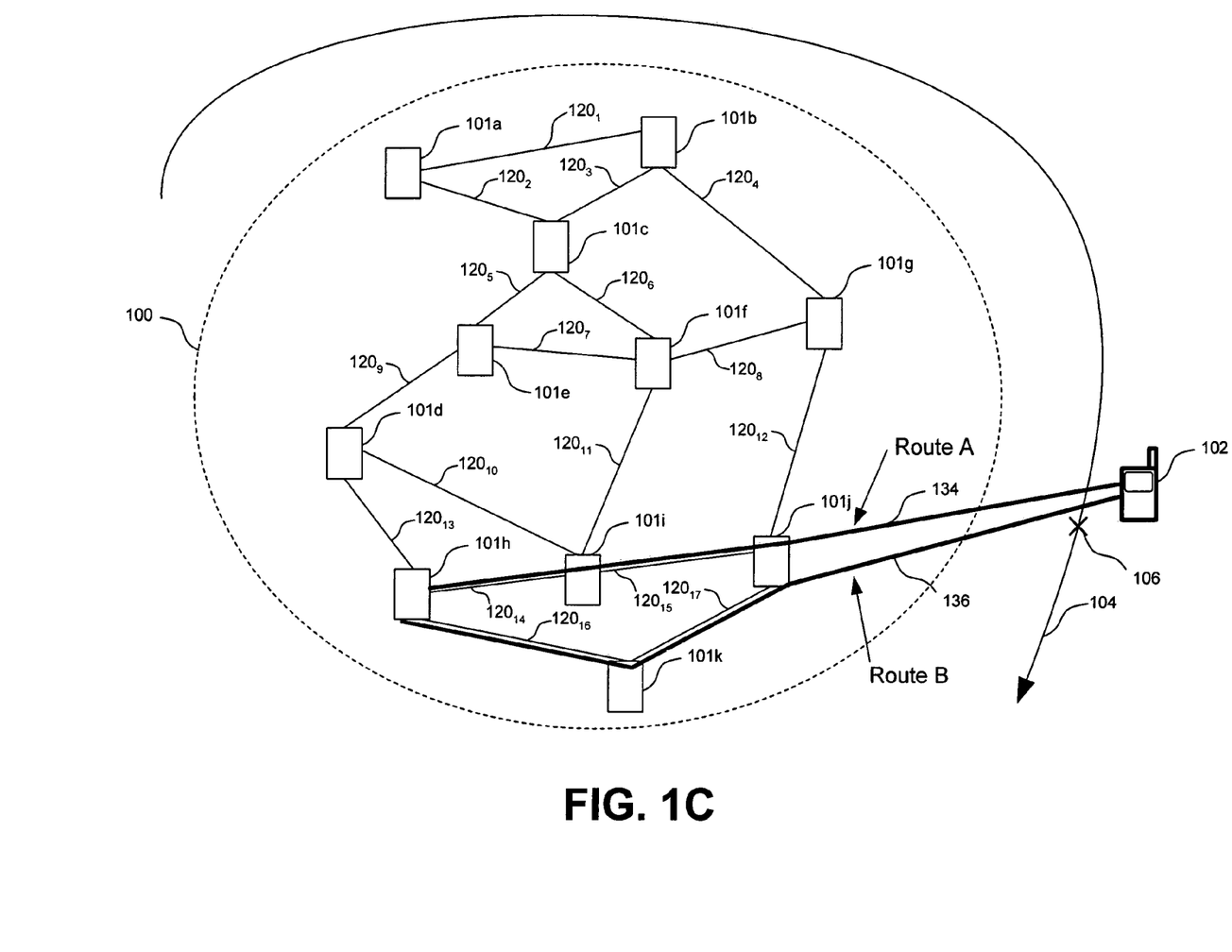

Before describing the invention in detail, it is helpful to describe an environment in which the invention may be used. Accordingly, FIGS. 1A-1C are diagrams of an exemplary operational environment involving an ad-hoc multihop network 100. Network 100 includes a plurality of nodes 101. Each node 101 may have a media access control (MAC) address, such as an Internet Protocol (IP) address. Accordingly, each node 101 may be represented in the network by its address.

As shown in FIGS. 1A-1C, communications paths 120 exist between various nodes 101. These paths are used for the exchange of data and control information. Each communications path 120 may include multiple links, such as separate control and data links. The data links may be used for the transfer of data associated with user applications. The control links may used to exchange control information regarding network 100 and to establish data links. In addition, the control links may be used to transfer certain types of user data associated with, for example, user applications. These control and data links may be short-range ad-hoc connections (e.g., Bluetooth and/or WLAN links). In addition, these data links may employ technologies, such as UWB.

Nodes 101 may be fixed or mobile. For instance, nodes 101 may be portable communications devices, such as wireless telephones or personal digital assistants (PDAs). Alternatively, nodes 101 may be fixed devices, such as access points. As an example of a mobile node, FIG. 1A shows a mobile terminal device 102. Terminal device 102 includes multiple radios. At least one of these radios may support a control link, while at least another of these radios may support a data link.

As shown in FIG. 1A, terminal device 102 moves along a path 104. While traveling along this path, terminal device 102 may form short-range communications connections (referred to herein as encounters) with various remote nodes 101 that are within communications range. An example of such an encounter is shown in FIG. 1B.

In particular, FIG. 1B shows terminal device 102 having an encounter with node 101j at a position 106, which is in path 104. This encounter involves a control link 130. Control link 130 is an ad-hoc wireless connection (e.g., a Bluetooth or WLAN connection) that terminal device 102 supports through a control radio. Across control link 130, terminal device 102 exchanges control information with remote node 101j. This control information pertains to the characteristics of network 100 and may be in the form of packets. Such packets are referred to herein as control packets. For instance, terminal device 102 may receive or collect information regarding the present status of network 100. Examples of such information include topology information, node capability information, and information regarding interference levels present in various portions (e.g., various links) of network 100. In addition, this exchange may involve terminal device 102 transmitting information regarding itself. Such transmitted information is used by remote nodes 101 to compile information regarding the present status of network 100.

Such information transmitted by terminal device 102 may be forwarded by node 101j to other nodes 101. Through the transmission of such information, one or more of nodes 101 may know that the terminal device 102 exists in network 100 and that terminal device 102 may exchange data packets with devices 101. Accordingly, with the establishment of link 130, terminal device 102 participates as a node in network 100.

In addition, the exchange of such information may set up one or more additional communications connections. For instance, FIG. 1B shows a data link 132, which is established through the exchange of information across control link 130. Data link 132 may employ technologies, such as a Bluetooth, WLAN, UWB, or other wireless communications technologies. In embodiments of the present invention, details regarding the operation of data link 132 (e.g., timing and/or frequency allocations) are established through communications across control link 130. As described above, terminal device 102 includes separate radios to support links 130 and 132.

Together, links 130 and 132 provide a communications path between terminal device 102 and node 101*j*. This communications path allows terminal device 102 to exchange user data (e.g., data associated with higher protocol layers, such as the application layer) with one or more remote nodes 101.

By participating in network 100, terminal device 102 may communicate with various nodes 101. In the example of FIG. 1B, communications with nodes other; than node 101*j* involve multiple hops across various routes. For purposes of illustration, FIG. 1C shows two exemplary routes between terminal device 102 and node 101*h*.

In particular, FIG. 1C shows a route 134 (labeled "Route A"). Route 134 includes path $120_{14}$, path $120_{15}$, and the path between node 101*a* and terminal device 102. In addition, FIG. 1C shows a route 136 (labeled "Route B"). Route 136 includes path $120_{16}$, path $120_{17}$, and the path between node 101*j* and terminal device 102. As described above, the path between node 101*j* and terminal device 102 includes control link 130 and data link 132.

With respect to the exemplary routes of FIG. 1C, when device 101*j* receives a transmission from terminal device 102 that designates node 101*h* as a destination, it may forward the transmission to different nodes based on the employed route. For example, when route 134 is employed, transmissions are forwarded along path $120_{15}$. Alternatively, when route 136 is employed, transmissions are forwarded along path $120_{17}$.

II. Terminal Device

Figure 2:
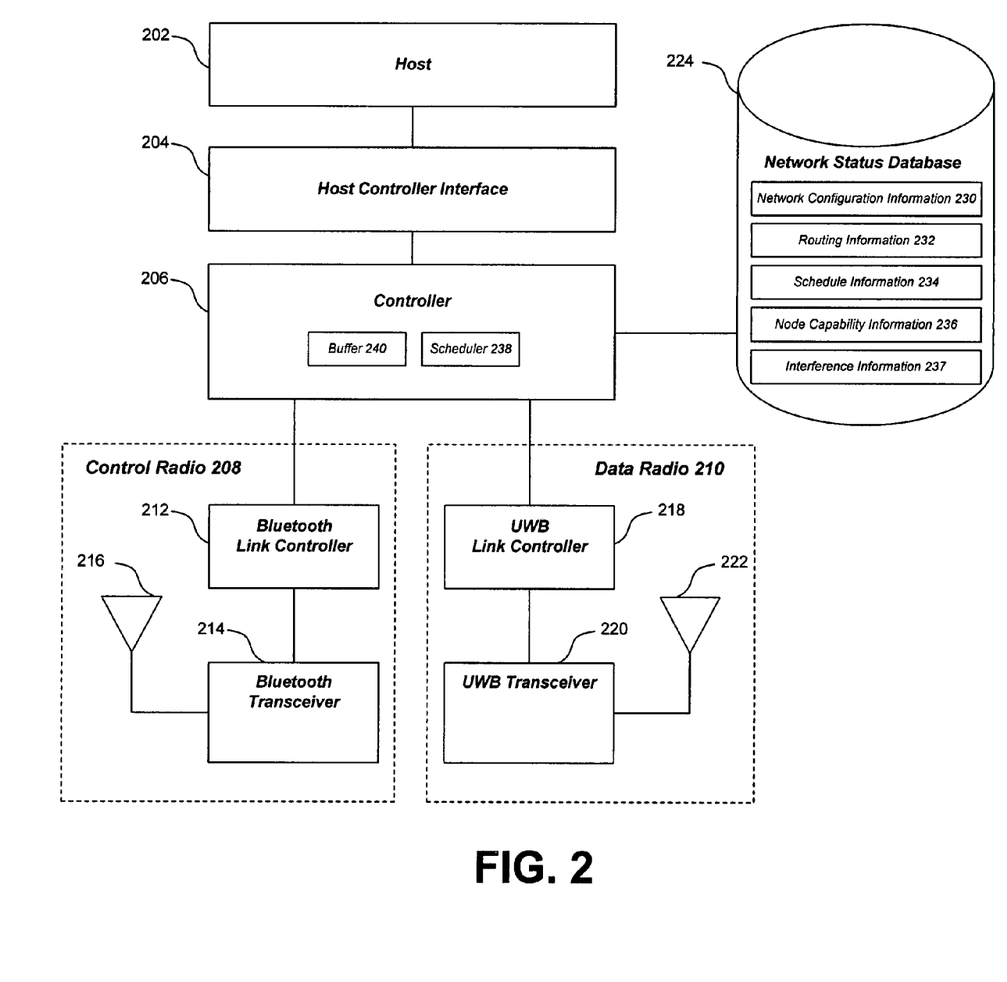
FIG. 2 is a block diagram of an exemplary communications device architecture according to an embodiment of the present invention.

FIG. 2 is a block diagram showing an embodiment of a wireless communications device architecture, which may be used for terminal device 102. This architecture includes a host 202, a host controller interface (HCI) 204, a controller 206, a control radio 208, and a data radio 210.

Host 202 is responsible for functions involving user applications and higher protocol layers. Host 202 exchanges information with controller 206 across HCI 204. This information may include commands received from host 202, and information transmitted to host 202. HCI 204 defines a set of messages, which provide for this exchange of information.

Controller 206 performs functions related to link set-up, security and control. These functions involve discovering remote devices and communicating with them according to one or more protocols (such as the Bluetooth link manager protocol). To perform these functions, such protocols provide messages, which are also referred to as protocol data units (PDUs). Controller 206 exchanges these PDUs with corresponding controllers at remote devices. In addition, controller 206 buffers and schedules data for transmission to other mesh network nodes.

FIG. 2 shows that controller 206 is coupled to both control radio 208 and data radio 210, which are responsible for lower layer communications protocols. In particular, control radio 208 is responsible for the exchange of control information with remote devices, and data radio 210 is responsible for the exchange of user data with remote devices.

For purposes of illustration, FIG. 2 illustrates control radio 208 as having Bluetooth capabilities and data radio 210 as having UWB capabilities. However, other arrangements and communications technologies are within the scope of the present invention. For example, control radio 208 and/or data radio 210 may have WLAN capabilities FIG. 2 shows that control radio 208 includes a Bluetooth link controller 212, a Bluetooth transceiver 214, and an antenna 216. Link controller 212 operates as an intermediary between controller 206 and transceiver 214. Link controller 212 also performs baseband processing for Bluetooth transmissions, such as error correction encoding and decoding.

In addition, link controller 212 may exchange data between corresponding link controllers at remote devices according to physical layer protocols. Examples of such physical layer protocols include retransmission protocols such as the automatic repeat request (ARQ) protocol. Bluetooth transceiver 214 is coupled to an antenna 216. Transceiver 214 includes electronics that allow the device architecture of FIG. 2 (in conjunction with antenna 216) to exchange wireless Bluetooth signals with remote devices. Such electronics include modulators, demodulators, amplifiers, and filters.

FIG. 2 shows that data radio 210 includes a UWB link controller 218, a UWB transceiver 220, and an antenna 222. Link controller 218 operates as an intermediary between controller 206 and UWB transceiver 220. Link controller 218 also performs baseband processing for UWB transmissions, such as error correction encoding and decoding. In addition, link controller 218 may exchange data between corresponding link controllers at remote devices according to physical layer protocols. Examples of such physical layer protocols include retransmission protocols such as the automatic repeat request (ARQ) protocol.

UWB transceiver 220 is coupled to antenna 222. UWB transceiver 220 includes electronics that allow the device of FIG. 2, in conjunction with antenna 222, to exchange (i.e., transmit and receive) wireless UWB signals with remote devices. For instance, UWB transceiver 220 may employ impulse radio (IR) transmission techniques. IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals. Accordingly, UWB transceiver 220 may include components, such as pulse generation circuitry. For the reception of signals, UWB transceiver 220 may include components, such as timing circuitry and filters.

As described above, the architecture of FIG. 2 includes a network status database 224. Database 224 stores information regarding the current status of network 100. This information may include one or more of the following: network configuration information 230, routing information 232, schedule information 234, node capability information 236, and interference information 237.

Network configuration information 230 may include identifiers for nodes 101 and descriptive information regarding the topology of network 100. The node identifiers may be in the form of network addresses, such as Bluetooth or IP addresses.

Routing information 232 provides the terminal device with information regarding where particular transmissions (e.g., packets) should be sent. This information may be based on each transmission's ultimate destination. For instance, based on a destination node identified in a packet header, the terminal device may employ routing information to select a corresponding neighboring node. The terminal device may then transmit the packet to this neighboring node. Accordingly, routing information 232 may be stored in the form of a lookup table indexed according to destination.

In addition to next hop information, routing information 232 may identify end-to-end routes that provide devices with the capability to identify the number of hops required for various routes. For example, such end-to-end information may include, for each source node/destination node pairing, one or more sequences of hop identifiers. This end-to-end information (in conjunction, for example, with node capability information 236 and/or interference information 237) may be used by the terminal device to determine the merits of various routes based on the strength or weakness of each hop's communications links.

Schedule information 234 may include information regarding the transmission patterns (e.g., times and frequencies) of other nodes. In addition, schedule information 234 may include information regarding communications capacity (such as time slots and frequencies) assigned to the terminal device.

Node capability information 236 provides the terminal device with information regarding the communications capabilities of other nodes in the network. For example, this information may include the types of radios in each node as well as the data rates supported by each node.

Interference information 237 may include information regarding interference levels for each link in the network. This information may be based, for example, on error rates, and signal measurements determined by devices which transmit and/or receive signals across the corresponding links. As described above, such information may be distributed by communications across control links.

As described above, controller 206 buffers and schedules data for transmission. Accordingly, FIG. 2 shows that controller 206 includes a scheduler 238 and a buffer 240. These components handle the transmission of user data to nodes within a mesh network, such as network 100. In particular, buffer 240 stores user data in the form of packets for wireless transmission. This data may be stored in the one or more buffer entries. In embodiments, each buffer entry includes a single packet. However, in further embodiments, each buffer entry may include a fraction of a packet or multiple packets.

Scheduler 238 services the entries in buffer 240 by assigning times for their transmission. These entries may be serviced according to various approaches, such as first-in first-out (FIFO) or a quality of service (QOS) based approach.

Although FIG. 2 shows a Bluetooth control radio and a UWB data radio, embodiments of the present invention may employ other technologies. For instance, an exemplary device architecture may employ a Bluetooth control radio and a WLAN data radio. Also, the same communications technology (e.g., WLAN or Bluetooth) may be employed for both control and data radios. Moreover, wireless device architectures according to embodiments of the present invention may include multiple data radios and/or multiple control radios.

As described above, user data may be transmitted across data or control links. In devices that include different types of control and data radios (such as the device of FIG. 2), the characteristics of the control and data radios may be taken into account to select a suitable radio for the transmission of user data. Such radio selection techniques may also be made in devices having multiple data radios and/or multiple control radios. Examples of such characteristics include, for example, bit rate capabilities, interference susceptibility, and the potential for interfering with other transmissions.

Figure 3:
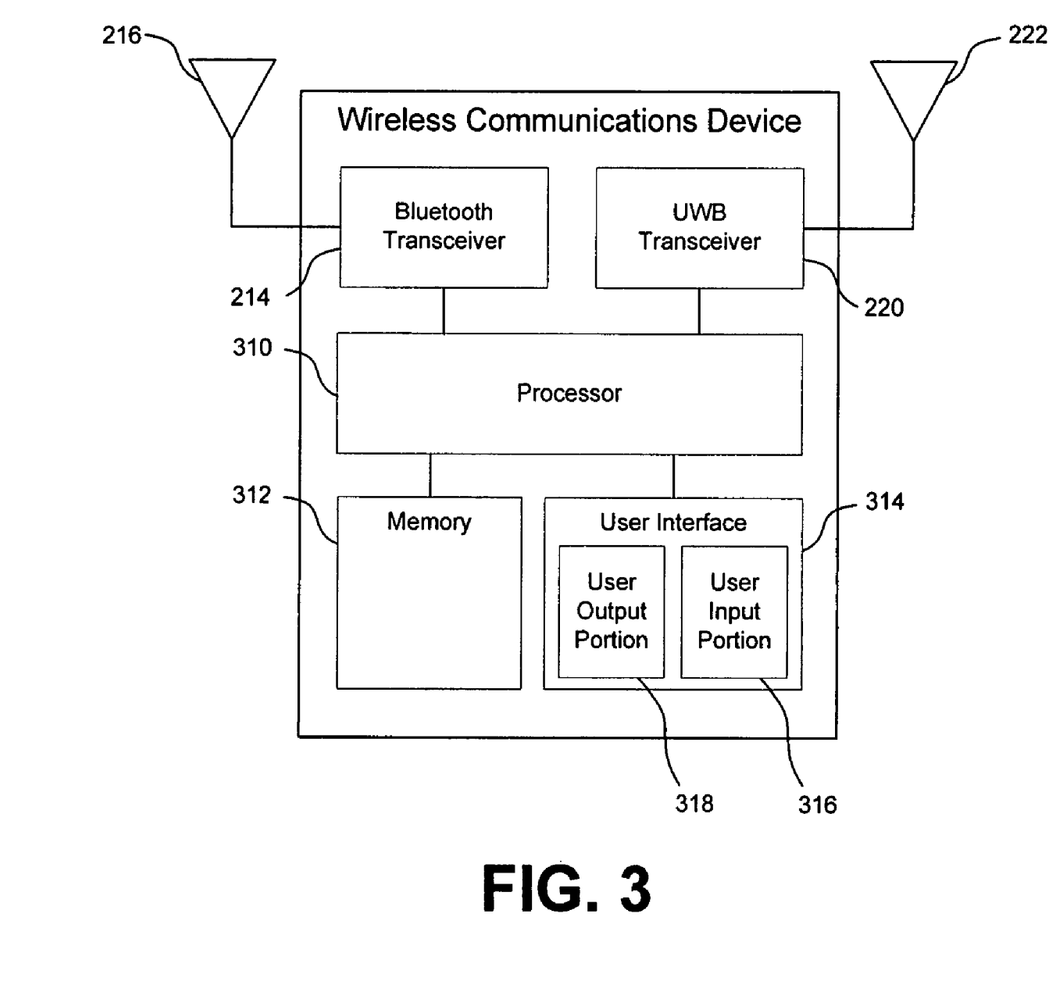
FIG. 3 is a block diagram of an exemplary communications device implementation according to an embodiment of the present invention.

Device architectures, such as the architecture of FIG. 2, may be implemented in hardware, software, firmware, or any combination thereof. One such implementation embodying the present invention is shown in FIG. 3. This implementation includes a processor 310, a memory 312, and a user interface 314. In addition, the implementation of FIG. 3 includes Bluetooth transceiver 214, antenna 216, UWB transceiver 220, and antenna 222. These components may be implemented as described above with reference to FIG. 2. However, as described above, the implementation of FIG. 3 may be modified to include different transceivers (e.g., WLAN transceivers) that support other wireless technologies. Also, the implementation of FIG. 3 may include a greater number of transceivers to support, for example, multiple control radios and/or multiple data radios.

Processor 310 controls device operation. As shown in FIG. 3, processor 310 is coupled to transceivers 214 and 220. Processor 310 may be implemented with one or more microprocessors that are each capable of executing software instructions stored in memory 312.

Memory 312 includes random access memory (RAM), read only memory (ROM), and/or flash memory, and stores information in the form of data and instructions. These instructions that can be executed by processor 310. Various types of instructions may be stored in memory 312. For instance, memory 312 may store instructions that control the operation of transceivers 214 and 220 (and/or other transceivers). Also, memory 312 may store instructions that provide for the functionality of host 202, HCI 204, controller 206, link controller 212, and link controller 218.

In addition, memory 312 may store instructions that control the exchange of information through user interface 314. As shown in FIG. 3, user interface 314 is also coupled to processor 310. User interface 314 facilitates the exchange of information with a user. FIG. 3 shows that user interface 314 includes a user input portion 316 and a user output portion 318. User input portion 316 may include one or more devices that allow a user to input information. Examples of such devices include keypads, touch screens, and microphones. User output portion 318 allows a user to receive information from the device. Thus, user output portion 318 may include various devices, such as a display, and one or more audio speakers. Exemplary displays include liquid crystal displays (LCDs), and video displays.

The elements shown in FIG. 3 may be coupled according to various techniques. One such technique involves coupling transceivers (such as transceivers 214 and 220), processor 310, memory 312, and user interface 314 through one or more bus interfaces. In addition, each of these components is coupled to a power source, such as a removable and/or rechargeable battery pack (not shown).

III. Capacity Allocation

Figure 4:
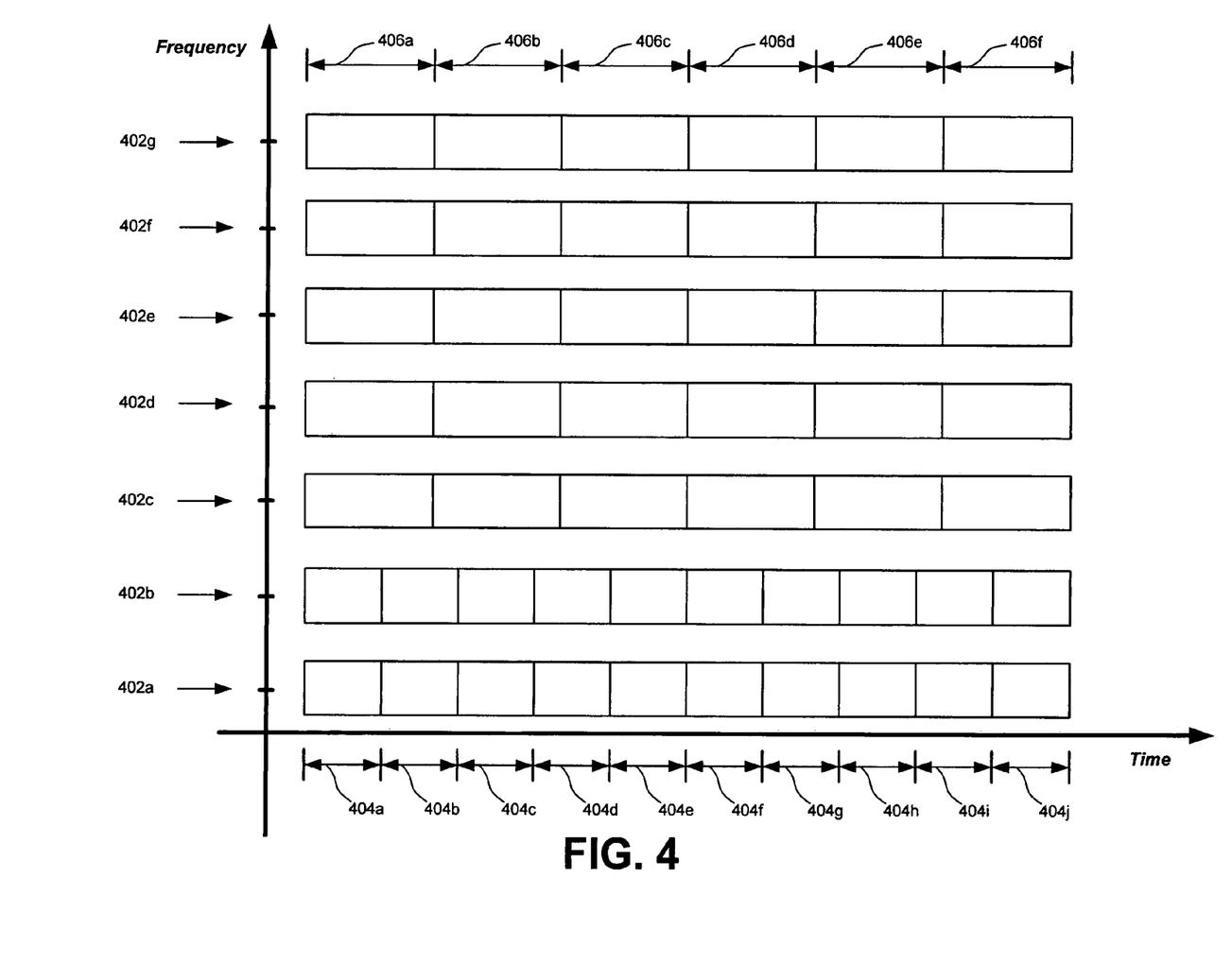
FIG. 4 is a diagram illustrating an exemplary allocation of network capacity.

Communications capacity in ad-hoc mesh networks (such as network 100) may be allocated according to various techniques across portions of the frequency and time domains. FIG. 4 is a diagram illustrating an exemplary allocation of bandwidth (i.e., capacity) in a mesh network, such as network 100, according to an embodiment of the present invention. The bandwidth of FIG. 4 includes a plurality of frequency channels 402. Each frequency channel 402 may be either a control channel or a data channel. For example, frequency channels 402a and 402b are control channels, while frequency channels 402c-g are data channels.

Moreover, each of channels 402 may be divided into a plurality of timeslots, which occur in a repeating pattern. These timeslots are referred to herein as frames. FIG. 4 shows that control channels 402a-b are divided into frames 404. Similarly, data channels 402c-g are divided into frames 406. Each frame in a particular frequency channel 402 may be allocated to a particular device for transmitting information. For instance, one or more timeslots 404 in control channels 402a-b and one or more timeslots 406 in data channels 402c-g may be allocated to terminal device 102.

The allocation of time slots may occur upon link establishment. For example, when terminal device 102 establishes a control link with a remote node 101, it may be allocated one or more control channel timeslots 404 through short-range (e.g., Bluetooth or WLAN) connection establishment procedures. In addition, the allocation of timeslots, such as data channel timeslots, may be handled in embodiments by request and grant messages in the form of control packets. These messages may be exchanged with a remote node through a control link, such as control link 130.

In embodiments of the present invention, particular traffic and control allocations may involve multiple frequencies. For example, when frequency hopping is employed, allocations may involve particular time slots at varying frequencies. Moreover, allocations may spread throughout a frequency range when transmission techniques, such UWB and direct sequence spread spectrum, are employed.

IV. Operation

Figure 5:
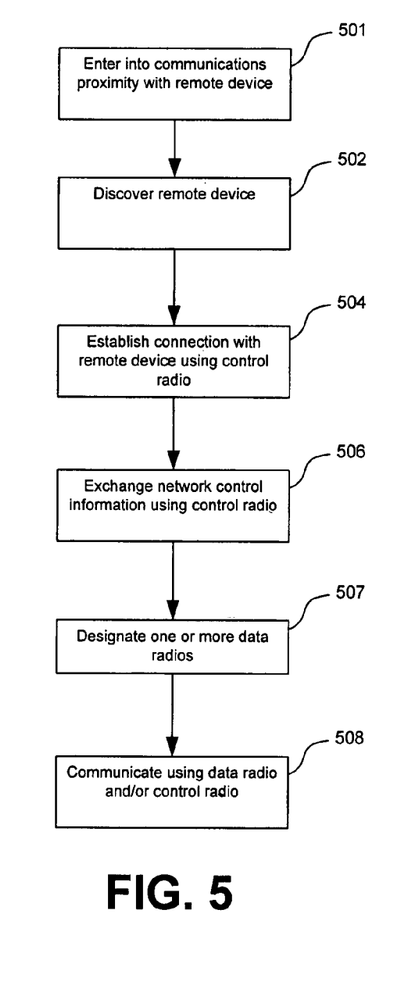
FIGS. 5 and 6 are flowcharts illustrating operations of a terminal device according to embodiments of the present invention.

FIG. 5 is a flowchart illustrating an operation of a wireless terminal device, such as terminal device 102, according to an embodiment of the present invention. In this operation, the device interacts with an ad-hoc mesh network, such as network 100. As shown in FIG. 5, this operation includes a step 501. In this step, the terminal device and a remote device, such as one of nodes 101, enter into short-range communications proximity.

Next, in a step 502, the terminal device and the remote device learn the identity (or discover the existence) of each other. This step may involve the terminal device employing its control radio (e.g., control radio 208). Accordingly, when the control radio employs Bluetooth, step 502 may comprise the devices engaging in an inquiry process.

In a step 504, the terminal device establishes an ad hoc short-range wireless connection with the remote device using its control radio. This wireless connection may employ various technologies, such as Bluetooth and WLAN. When this wireless connection is a Bluetooth link, step 504 may comprise the terminal device and the other device performing a paging process.

In a step 506, the terminal device employs its control radio and exchanges network control information (e.g., control packets) with the remote device. This control information may include network configuration information, routing information, schedule information, interference information, and node capability information.

In addition, this network control information may include information exchanged to establish and initiate a data link, such as a UWB data link. Accordingly, in a step 507, the terminal device may designate one or more data radios. This designation may be based on one or more factors. Examples of such factors include data rates required for the terminal device's user data, interference levels, and the communications capabilities (e.g., radio types) of the remote device.

In a step 508, the terminal device communicates with one or more nodes in the mesh network. This step may involve the device using one or more designated data radios and/or its control radio.

V. Bluetooth Control Link

As described above, when the control radio employs Bluetooth, step 502 may comprise an inquiry process and step 504 may comprise a paging process.

During this inquiry process, either the terminal device or the remote device operates in an inquiry state while the other device operates in an inquiry scan state. The device operating in the inquiry state is referred to herein as the initiating device.

When operating in the inquiry state, the initiating device transmits an inquiry packet and the other device listens for inquiry packets. When the other device receives the inquiry packet from the initiating device, it transmits one or more frequency hop synchronization (FHS) packets, which are received by the initiating device. The FHS packet(s) allow the initiating device to become synchronized with the hop sequence of the other device. In addition, the FHS packet(s) enable the initiating device to derive information necessary to make a Bluetooth connection with the other device. This information includes the native clock of the other device (CLKN), the Bluetooth address (BD_ADDR) of the other device, and error correction coding information.

Upon successful completion of this inquiry process, step 504 may comprise a paging process. Bluetooth paging involves the exchange of various information between the initiating device (which is in a paging state) and the other device (which is in a page scan state). This exchange of information results in an unsecured connection being established between the terminal device and the remote device.

During paging, the initiating device enters the paging state and transmits one or more paging packets. Each of these paging packets includes an identification number based on the address of the remote device. Meanwhile, the other device (which is in the page scan state) responds to the paging packets by transmitting a packet containing its address.

The initiating device receives this packet from the other device. In response, the initiating device transmits a frequency hop synchronization (FHS) packet. The FHS packet is used to pass information that allows the other device to synchronize with the frequency hopping sequence of the initiating device. Upon receipt of this FHS packet, the other device transmits a further packet to confirm receipt of the FHS packet.

At this point, a Bluetooth link is formed between the initiating device and the other device. Accordingly, both devices enter into a connection state. In the connection state, the initiating device operates as a master device and the other device operates as a slave device. Thus, the other device employs the timing and frequency hopping sequence of the initiating device. Additionally, the initiating device transmits a packet to verify that a link has been set up. The other device confirms this link by sending a packet to the initiating device.

VI. Data Communications

Figure 6:
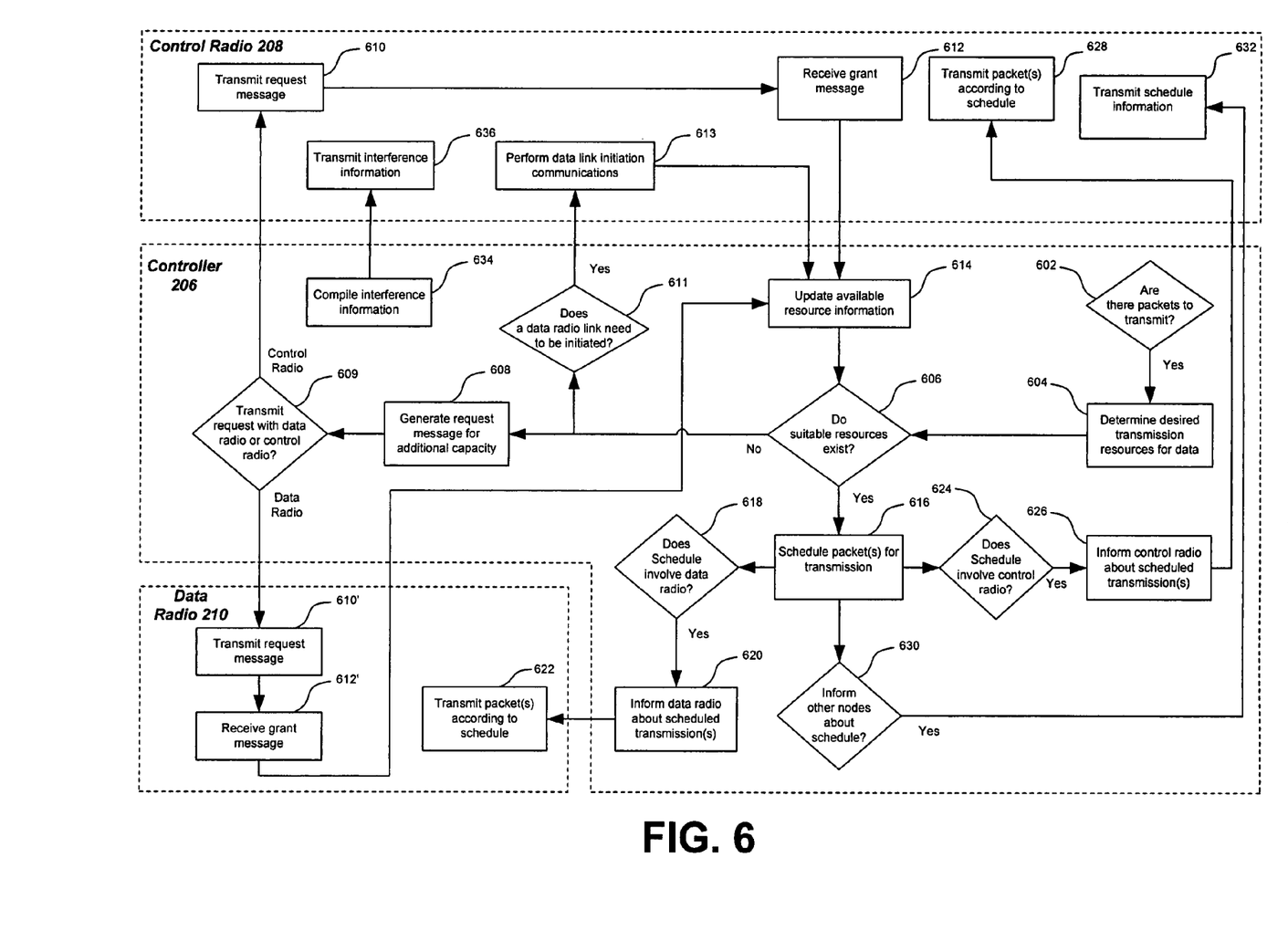

As described above, a terminal device may communicate with one or more mesh network nodes in step 508. FIG. 6 is a flowchart of an exemplary operation of a wireless communications device, such as terminal device 102 according to an embodiment of the present invention. In this operation, data communications are performed according to techniques of the present invention. This operation is described with reference to the terminal device architecture of FIG. 2. However, this operation may be employed with other device architectures.

FIG. 6 shows that this operation includes a step 602, in which the device determines whether it has any data for transmission. With reference to the implementation of FIG. 2, this step may include determining whether buffer 240 contains any data packets. If the device has data for transmission, then operation proceeds to a step 604. In this step, the device determines suitable (desired) transmission resources for the data.

Accordingly, step 604 may include selecting (or determining) one or more radios with which to transmit the data. This selection may be among a control radio (e.g., control radio 208) and a data radio (e.g., data radio 210). However, in embodiments, this selection may be among one or more control radios and one or more data radios.

Such determinations may be based on various factors. For instance, selecting the appropriate radio(s) for transmission may be based on the amount of data to be sent. As an example, a higher data rate radio (e.g., a UWB radio) may be preferable over a lower data rate radio (e.g., a Bluetooth radio) when a large amount of data is to be sent. A higher data rate radio may also be preferable when the data has time of delivery (e.g., real time) requirements.

Other factors may include radio coverage areas (i.e., communications range). For instance, a radio having a larger coverage area may be desirable because it may offer more robust communications for a mobile device. Also a larger coverage area may reduce the number of hops for traffic to reach certain destinations.

Also, determining the appropriate radio(s) for transmission may be based on environmental factors, such as interference levels associated with links of particular radios. For instance, a radio having a link subject to a lower interference level may be preferred over other radios having links subject to higher interference levels.

For multihop communications, radio selection in step 604 may also be based on configuration of the mesh network, such as node capabilities and routing information. For instance, when considering data to be sent across multiple hops, radio selection may be based on the routes available to each radio.

This may involve, for example, a "weakest link" analysis that selects among radios based on the least preferred hop in each radio's available route(s). For instance, when higher data rates are preferred, such an analysis may select a radio providing a route having four UWB routes instead of one providing three Bluetooth or WLAN routes. However, an analysis based on the number of hops (such as one preferring smaller numbers of hops), as well as one based on a combination of a weakest link analysis and the number of hops may be used.

Following step 604, a step 606 is performed. In step 606, the device determines whether suitable resources are currently allocated for transmission of the data packets. This step may comprise determining whether a data link has been previously established with a remote device, and if so, whether its properties (e.g., the communications capacity allocated to the data radio) are sufficient to transmit the data according to the one or more specified parameter(s) (e.g., minimum data rate).

If suitable resources are allocated, then operation proceeds to a step 616. Otherwise, operation proceeds to a step 608 and a step 611, which are performed independently. In step 608, the device generates a request message for additional capacity (e.g., additional data channel time slots). As indicated by a step 609, this request may be transmitted by either a control radio or a data radio. This maybe based on factors, such as resource allocation capabilities offered by the data radio's communications link, or the need to employ a separate link to engage in communications regarding resource allocation.

For instance, in a step 610, control radio 208 processes this request and transmits it to a remote node 101. In a step 612, control radio 208 receives a grant message in response to the request transmitted in step 610. This grant message contains information regarding allocated communications capacity. Similarly, in a step 610', data radio 210 processes this request and transmits it to a remote node 101. In a step 612', data radio 210 receives a grant message containing allocation information in response to the request transmitted in step 610'.

Step 611 involves situations where a data link is desired, but has not yet been established with the remote device. Accordingly, if the device determines that a link for a data radio needs to be established, a step 613 may be performed. In step 613, control radio 208 performs link initiation communications for a data link (such as a UWB link) with a remote device. Such communications may comprise prearranging a particular capacity allocation (e.g., a transmission schedule) for the device. Also, such communications may involve informing the receiving device (and possibly intermediate devices) to activate their corresponding data radios according to certain communications parameters. Such communications may also include responses, such as acknowledgements from remote devices. Step 613 may be useful for certain types of communications (such as UWB) in which regulations require a sender and a receiver to be associated before transmissions may commence.

FIG. 6 shows that a step 614 may follow steps 612, 612', and 613. In step 614, the device updates its available resource information. With reference to the implementation of FIG. 2, step 614 may include updating network status database 224.

Based on is updated information, operation returns to step 606, in which the device determines whether suitable resources are now currently allocated for the packets. If so, then the device assigns a transmission schedule for the packets in step 616.

As described above, the transmission schedule assigned in step 616 may involve employing one or more data radios to transmit the packet(s). Alternatively, this transmission schedule may employ the device's control radio to transmit the packet(s). In a further alternative, this transmission schedule may employ the device's control radio and one or more data radios to transmit the packet(s).

As indicated by a step 618, when the schedule involves a data radio, the device informs its data radio about the scheduled transmission(s) in a step 620. Following this step, the data radio transmits one or more packets according to the assigned schedule in a step 622.

Similarly, a step 624 indicates that when the schedule involves a control radio, the device informs its control radio about the scheduled transmission(s) in a step 626. Following this step, the control radio transmits one or more packets according to the assigned schedule in a step 628.

FIG. 6 shows a step 630 in which the device determines whether to inform other nodes about the transmission schedule. If so, then operation proceeds to a step 632 in which the device transmits scheduling information across its control link. This information may be distributed to remote nodes within proximity to the device. This decision to inform other nodes may be based on various factors, such as the employed data transmission techniques (e.g., UWB, Bluetooth, WLAN, etc.).

As described above, information regarding interference levels may be distributed among network nodes for their storage in, for example, network status database 224. Accordingly, FIG. 6 shows a step 634 in which controller 206 compiles interference information for one or more of the terminal device's links. This information may be received from radio (s), such as control radio 208 and/or data radio 210, which measure interference. Such measurements may be based on, for example, bit error statistics determined through error correction encoding techniques. In a step 636, control radio 208 transmits the compiled information to one or more remote nodes for distribution across the network.

FIG. 6 provides an exemplary mapping of steps to portions of the device architecture shown in FIG. 2. For instance, the steps of FIG. 6 are shown as being performed by link manager 206, control radio 208, and data radio 210. However, other mappings of these steps are within the scope of the present invention. Moreover, these steps may be performed with other device architectures. Such architectures may include (but are not limited to) ones having multiple data radios and/or multiple control radios.

VII. Conclusion

While various embodiments of the present invention have been described above, it should be understood that they have been presented by way of example only, and not in limitation. For instance, although examples have been described involving Bluetooth, WLAN, and UWB communications, other short-range and longer-range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A wireless communications device, comprising:
  a control radio in the wireless device, configured to wirelessly receive control information regarding an ad-hoc wireless network from at least one remote device belonging to the ad-hoc network;
  a data radio in the wireless device, configured to wirelessly exchange user data with the ad-hoc wireless network;
  a buffer connected to the data radio, configured to store user data for transmission to one or more remote devices in the ad-hoc wireless network; and
  a scheduler connected to the control radio and the data radio, configured to schedule transmission by the data radio of the user data based on the control information received by the control radio.

2. The wireless communications device of claim 1, further comprising:
  a memory configured to store the received control information.

3. The wireless communications device of claim 1, wherein the control radio is further configured to communicate according to Bluetooth.

4. The wireless communications device of claim 1, wherein the control radio is further configured to communicate according to WLAN.

5. The wireless communications device of claim 1, wherein the data radio is further configured to communicate according to ultra wideband (UWB).

6. The wireless communications device of claim 1, wherein the received control information includes configuration information corresponding to the ad-hoc wireless network.

7. The wireless communications device of claim 6, wherein the network configuration information includes topology information corresponding to the ad-hoc wireless network.

8. The wireless communications device of claim 1, wherein the received control information includes routing information.

9. The wireless communications device of claim 1, wherein the received control information includes information regarding communications capabilities of one or more nodes within the ad-hoc wireless network.

10. The wireless communications device of claim 1, wherein the received control information includes information regarding interference levels in the ad-hoc network.

11. A method comprising:
  (a) establishing a short-range wireless communications link with a remote device, wherein the short-range wireless communications link employs a control radio in a wireless device, configured to receive control information over the link regarding an ad-hoc wireless network;
  (b) exchanging control information between the control radio and the remote device regarding the ad-hoc wireless network, the exchange being across the short-range wireless communications link;
  (c) controlling a data radio in the wireless device, with the control radio by using the control information, to enable the data radio to exchange user data with one or more devices in the ad-hoc wireless network to schedule transmission by the data radio of the user data based on the control information received by the control radio; and
  (d) transmitting the user data across a data link with the data radio, in response to the control information.

12. The method of claim 11, wherein the short-range wireless communications link is a Bluetooth link.

13. The method of claim 11, wherein the short-range wireless communications link is a WLAN link.

14. The method of claim 11, wherein the wireless data link is an ultra wideband (UWB) link.

15. The method of claim 11, wherein step (d) comprises:
  establishing a transmission schedule for the user data, and
  sending the transmission schedule to the remote device across the short-range wireless communications link.

16. The method of claim 11, wherein step (d) comprises:
  transmitting to the remote device across the short-range wireless communications link a request for additional communications capacity when a communications capacity allocated to the data radio is insufficient for transmission of the user data.

17. The method of claim 16, wherein step (d) further comprises:
  receiving from the remote device across the short-range wireless communications link a grant of additional communications capacity for the data radio.

18. The method of claim 11, wherein step (d) comprises:
  transmitting to the remote device across the wireless data link a request for additional communications capacity when a communications capacity allocated to the data radio is insufficient for transmission of the user data.

19. The method of claim 18, wherein step (d) further comprises:
  receiving from the remote device across the wireless data link a grant of additional communications capacity for the data radio.

20. The method of claim 11, wherein step (d) comprises initiating the wireless data link for the data radio.

21. The method of claim 20, wherein initiating the wireless data link comprises performing data link initiation communications across the short-range wireless communications link.

22. The method of claim 11, wherein step (c) comprises designating the data radio based on its data rate capabilities.

23. The method of claim 11, wherein step (c) comprises designating the data radio based on its associated interference level.

24. The method of claim 11, wherein step (c) comprises designating the data radio based on its one or more available communications routes.

25. A wireless communications device, comprising:
  means for establishing a short-range wireless communications link with remote device, wherein the short-range wireless communications link employs a control radio in the wireless device, configured to receive control information over the link regarding an ad-hoc wireless network;
  means for exchanging control information between the control radio and the remote device regarding the ad-hoc wireless network, the exchange being across the short-range wireless communications link;

means for controlling a data radio in the wireless device, with the control radio by using the control information, to enable the data radio to exchange user data with one or more devices in the ad-hoc wireless network to schedule transmission by the data radio of the user data based on the control information received by the control radio; and means for transmitting the user data with the data radio, in response to the control information.

26. A wireless communications device, comprising:

a control radio in the wireless device, configured to exchange control information regarding an ad-hoc wireless network across the short-range wireless communications link;

one or more data radios in the wireless device, connected to the control radio and configured to exchange user data with one or more devices in the ad-hoc wireless network based on the control information exchanged by the control radio to schedule transmission by the one or more data radios of the user data based on the control information received by the control radio; and a controller connected to the control radio and the one or more data radios, configured to select among the control radio and the one or more data radios for the transmission of data that is ready to be sent to a remote node in the ad-hoc wireless network.

27. The wireless communications device of claim 26, wherein the control radio is further configured to communicate according to Bluetooth.

28. The wireless communications device of claim 26, wherein the control radio is further configured to communicate according to WLAN.

29. The wireless communications device of claim 26, wherein, at least on of the data radios is further configured to communicate according to ultra wideband (UWB).

30. The wireless communications device of claim 26, wherein the control is further configured to select among the control radio and the one or more data radios based on data rate capabilities of the control radio and the one or more data radios.

31. The wireless communications device of claim 26, wherein the control is further configured to select among the control radio and the one or more data radios based on interference levels associated with the control radio and the one or more data radios.

32. The wireless communications device of claim 26, wherein the control is further configured to select among the control radio and the one or more data radios based on available communications routes associated with the control radio and the one or more data radios.

33. A memory stores instructions for instructing a processor in a wireless communications device, the memory comprising:

instructions for enabling the processor to establish a short-range wireless communications link with remote device, wherein the short-range wireless communications link employs a control radio in the wireless device, configured to receive control information over the link regarding an ad-hoc wireless network;

instructions for enabling the processor to exchange control information between the control radio and the remote device regarding the ad-hoc wireless network, the exchange being across the short-range wireless communications link;

instructions for enabling the processor to control a data radio in the wireless device, with the control radio by using the control information, to enable the data radio to exchange user data with one or more devices in the ad-hoc wireless network to schedule transmission by the data radio of the user data based on the control information received by the control radio; and instructions for enabling the processor to transmit the user data with the data radio, in response to the control information.

* * * * *

UNITED STATES PATENT AND TRADEMARK OFFICE
CERTIFICATE OF CORRECTION

PATENT NO. : 7,697,893 B2
APPLICATION NO. : 10/870060
DATED : April 13, 2010
INVENTOR(S) : Kössi et al.

It is certified that error appears in the above-identified patent and that said Letters Patent is hereby corrected as shown below:

Column 15

Line 35 (Claim 29), "wherein, at least on of the data radios" should read,

--wherein, at least one of the data radios--.

Signed and Sealed this

Sixth Day of July, 2010

David J. Kappos
*Director of the United States Patent and Trademark Office*